July 27, 1965  W. G. McKENZIE  3,197,088
METERING DEVICE
Filed July 11, 1962  2 Sheets-Sheet 1
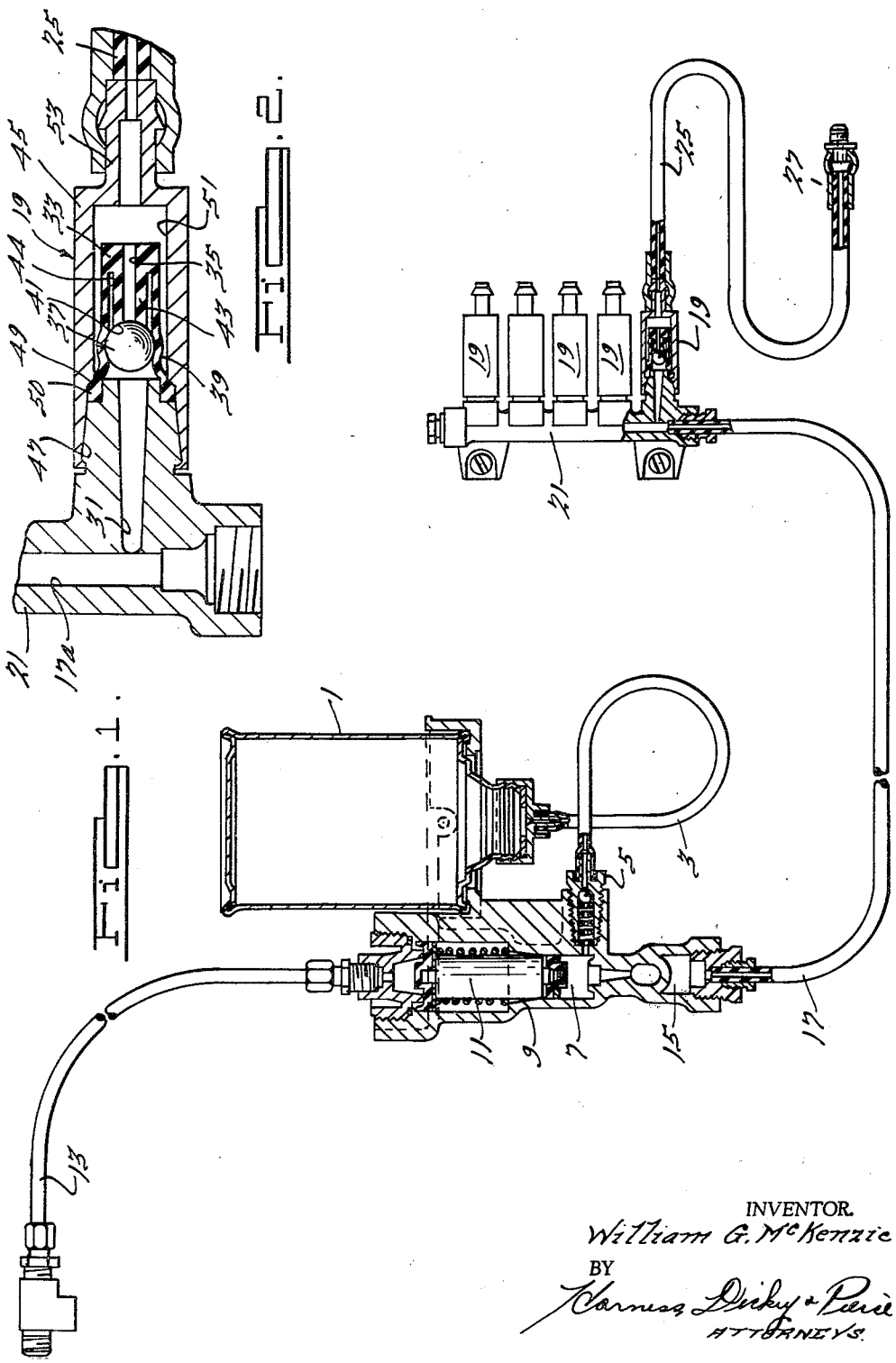
INVENTOR.
William G. McKenzie
BY
Harness, Dickey & Pierce
ATTORNEYS July 27, 1965  W. G. McKENZIE  3,197,088
METERING DEVICE
Filed July 11, 1962  2 Sheets-Sheet 2
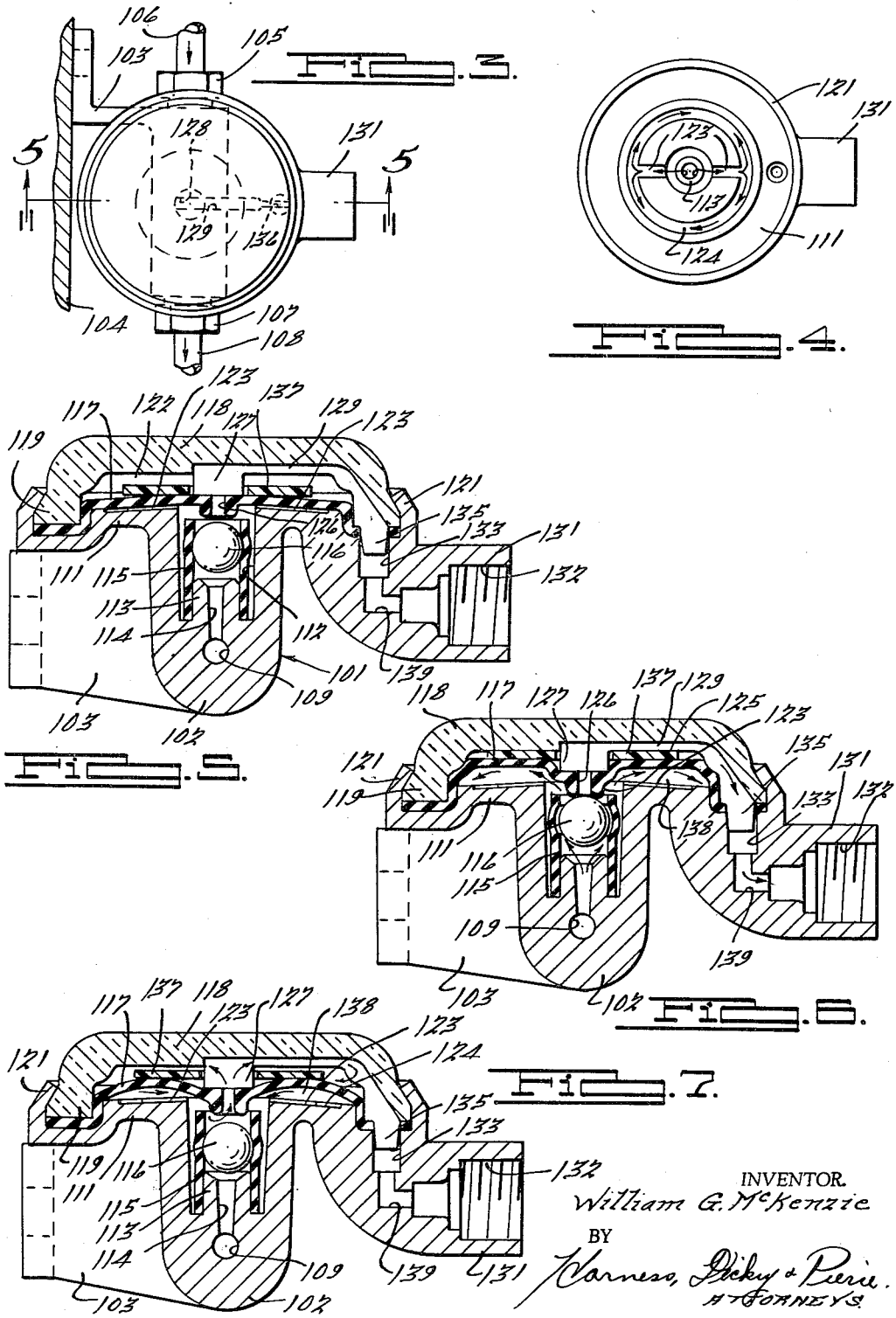
INVENTOR.
William G. McKenzie
BY
Harness, Dickey & Pierce
ATTORNEYS 3,197,088
METERING DEVICE
William G. McKenzie, Racine, Wis., assignor to Walker Manufacturing Company, Racine, Wis., a corporation of Delaware
Filed July 11, 1962, Ser. No. 209,131
9 Claims. (Cl. 222—453)

This application constitutes a continuation-in-part of my copending applications Serial No. 799,787, filed March 16, 1959, and Serial No. 841,500, filed September 22, 1959, now Patent Nos. 3,051,263 and 3,115,282, respectively.

This invention relates to pressure feed systems for dispensing liquids, such as lubrication systems, and more particularly to metering devices therefor.

It is an object of the present invention to provide a novel and improved type of metering device which may be used to repeatedly supply accurately measured quantities of fluid under pressure.

It is another object to provide an improved metering device of this character which will function to maintain continuous pressure at the delivery point in cases where there is a temporary blockage, for example, in the case of a frozen bearing.

It is also an object to provide an improved metering device in which the construction of the device may be so chosen as to supply any one of different quantities of metered fluid during each cycle.

It is a further object to provide an improved metering device of this nature which is of simple and economical construction, is reliable in use and requires little maintenance.

It is also an object, in one form of the invention, to provide an improved metering device of this type which prevents back flow of fluid to the pump during portions of the cycle in which supply pressure is relieved, thus permitting faster fluid delivery for a given pump size.

Other objects, features, and advantages of the present invention will become apparent from the subsequent description, taken in conjunction with the accompanying drawings.

In the drawings:

FIGURE 1 is a view, partly broken away and partly in section, and with parts removed, showing a liquid dispensing system incorporating one embodiment of the improved metering device;

FIGURE 2 is an enlarged cross-sectional view of the metering valve shown in FIGURE 1;

FIGURE 3 is a top plan view of another embodiment of the metering valve;

FIGURE 4 is a view similar to FIGURE 3 but with the dome, diaphragm sleeve and ball valve removed and showing the oil groove pressure path under the diaphragm;

FIGURE 5 is a cross-sectional view taken along the line 5—5 of FIGURE 3 and showing the valve components in their normal rest position;

FIGURE 6 is a view similar to FIGURE 5 but showing the parts when a pressure signal is applied; and FIGURE 7 is a view similar to FIGURES 5 and 6 but showing the exit path of pressure fluid upon relief of inlet pressure.

Referring first to FIGURE 1 for an over-all glance at the functioning of the dispensing system, the reservoir or supply of liquid to be furnished is illustrated in the form of a cartridge or can 1 which is suitably vented so that it contains the liquid at atmospheric pressure. It supplies liquid through the line 3 and check valve device 5 to pump chamber 7. The pump chamber 7 is formed in a housing 9 containing the pump piston 11 which is actuated by pressure fluid furnished to it through line 13. Liquid from can 1 under pressure of the pump piston 11 flows through an air eliminating valve device that does not appear on FIGURE 1, into an air elimination chamber 15 and then into a main conduit 17. The main pressure line 17 supplies liquid to a battery of metering devices or valves 19. These valves may be formed as parts of one or more manifolds 21 if desired. The metering valves 19 furnish predetermined quantities of oil or liquid under pressure to the individual delivery lines 25 which will run to each of the points to be lubricated or to receive the liquid being supplied. The meters are also capable of maintaining pressure at all times on lines 25, a desirable feature for a lubrication system. The end of each of the lines 25 is provided with a suitable fitting 27 for attachment to the apparatus at the point to receive fluid.

Referring now to the metering valve 19 as best illustrated in FIGURES 1 and 2, it will be seen that liquid reaches it from a passage 31 which is supplied with liquid from the main line passage 17a in the manifold block 21, the passage 17a being an extension of the main conduit 17. As illustrated in FIGURES 5–9 of my copending application Serial No. 799,787, the metering valve 19 includes an elastic bladder 33 which is formed of rubber, neoprene, or suitable elastic material that is not adversely affected by the liquids being dispensed. The bladder 33 has a through passage 35 which receives liquid supplied to the metering device from passage 31 after liquid has succeeded in passing by the ball-type valve 37 which is, as shown, somewhat larger in diameter than the diameter of a cylindrical skirt portion 39 of the bladder 33. The ball 37 seats against skirt 39 and also can, as shown, seat against the contoured end face 41 of a cylindrical boss or neck 43 which is inside of and partially coextensive with the outer and thinner skirt 39, and it is also possible for it to seat against the end of passage 31. Due to the fact that the skirt 39 surrounds a portion of the length of the boss 43 and is spaced from it an annular chamber 44 is provided downstream of the ball. As will become apparent hereinafter, it is this chamber which measures or meters the quantity of liquid delivered during each cycle of operation.

Surrounding the bladder 33 is a cylindrical jacket 45 which is affixed in a suitable manner at 47 to the manifold 21. The jacket 45 may be provided with a shoulder 49 to engage and compress a thickened rim 50 on the end of skirt 39 against the manifold 21. The jacket 45 forms a chamber 51 around the bladder 33 and has an outlet nipple 53 so that the feed line 25 can be readily attached. The jacket is preferably small enough in diameter to furnish radial support for the bladder 33 to prevent excessive expansion in the event of unduly high pressures in the system.

In operation, when the pressure of liquid in the line 17a is raised to elevate the pressure of liquid in passage 31, the ball 37 will be forced tightly against the surface 41 to prevent the flow of liquid into the passage 35. However, the liquid under pressure can operate to expand the skirt 39 so that it no longer is in contact with the surface of the ball 37 and causes the skirt to balloon outwardly into the chamber 51. This reduces the volume of the chamber outside of the bladder 33 and increases the pressure on liquid in it so that liquid from the chamber is injected at relatively high pressure into line 25 through the outlet passage in nipple 53. As the pressure in the lines 31 and 17a is subsequently reduced, the higher pressure in the chamber 51 on the outside of skirt 39 as well as the elasticity of the skirt itself will cause the skirt to contract. As this occurs, liquid inside of the bladder flows back into passage 31 and line 17. After a certain amount of pressure reduction and back flow the skirt 39 contacts the ball 37 and seals off the space inside of the bladder which is downstream from the ball, i.e., the chamber 44. Thus there is trapped in the chamber 44, at high pressure, a metered quantity of liquid. At this instant skirt 39 has not completely contracted because ball 37 is larger in diameter than the inside width of the skirt. As the upstream pressure drops more, the higher pressure on the downstream side of the ball forces it slightly off its seat allowing a predetermined quantity of liquid to flow from chamber 44 through passage 35 to enter chamber 51, in preparation for the next cycle of liquid injection into line 25. At the same time there is some additional back flow into line 31 as the skirt 39 continues to contract.

When the pressure of liquid in line 31 is raised again, the expanded bladder 33 will force a quantity of fluid from chamber 51 to flow downstream (or be compressed if some gas is in chamber 51) into line 25. This quantity corresponds to the volume of expansion of the bladder. Upon subsequent contraction of bladder 33 when the pressure in line 31 is reduced, there will be a back flow from line 25 into chamber 51 which along with the metered quantity of liquid from chamber 44 fills the space previously occupied by the expanded bladder in chamber 51. Thus, the volume of liquid injected will be the volume of expansion of the bladder (reduction of volume of chamber 51) less the volume of back flow and this equals the metered volume of liquid. Hence, on each cycle the net volume of liquid injected is the metered quantity determined by the size of chamber 44.

Should the point to receive liquid be incapable of accepting it, e.g., a frozen bearing, the meter 19 will nevertheless function and maintain continuous pressure on it through line 25. In such case, the pressure of liquid in chamber 51 and the elasticity of the bladder will act to hold the skirt tight against the ball forming a seal to prevent back flow into passage 31 and consequent loss of pressure in chamber 51 and line 25. It will be seen therefore that the valves 19 meter and hold pressure downstream. Thus, if the point receiving liquid is one on which pressure should be maintained, the meter 19 will do that continuously regardless of conditions upstream of the ball 37.

FIGURES 3 to 7 show another embodiment of the metering device, generally indicated at 101, which includes a housing 102 having a portion 103 mountable on a stationary support 104. Housing 102 has an inlet port 105 for connection to a supply line 106 leading from the pump, and an outlet port 107 aligned with inlet port 105 and connectable to a line 108 leading to other metering devices. A pasage 109 connects ports 105 and 107.

Housing 102 has a relatively narrow lower portion and a circular outwardly extendnig upper portion 111. A central bore 112 leads downwardly from portion 111 into the lower portion of the housing and a central upward projection 113 is formed in the lower end of bore 112 and spaced inwardly therefrom. A passage 114 leads upwardly from passage 109 through projection 113.

An elastic tube or sleeve 115 of neoprene, rubber or other suitable elastic material not adversely affected by the liquid being dispensed, is secured at its lower portion to the outer surface of projection 113 and extends upwardly, being spaced inwardly from bore 112. The length of sleeve 115 is somewhat less than the height of bore 112. A ball-type valve 116 is disposed within sleeve 115, member 113 being somewhat larger in diameter than the unstressed internal diameter of sleeve 115.

A diaphragm 117 is disposed above upper portion 111 of housing 102. This diaphragm, like sleeve 115, being formed of rubber, neoprene or similar suitable elastic material. A dome or cover 118 is disposed above diaphragm 117, cover 118 preferably being fabricated of a transparent material such as any of certain known plastics.

Cover 118 is circular in shape and has a downwardly extending outer flange 119 engageable with the peripheral portion of diaphragm 117. An upwardly extending inturned flange 121 is formed at the periphery of housing portion 111 and engages cover 118 to firmly hold the cover and diaphragm in position. The height of cover flange 119 is such that a chamber or volume 122 of predetermined size will be formed betwen cover 118 and diaphragm 117, the diaphragm having a normal position against the upper surface of housing portion 111 as seen in FIGURE 5. Housing portion 111 is provided with radial grooves 123 and a circumferential groove 124 to facilitate fluid flow from bore 112 beneath the diaphragm.

A downwardly extending valve seat 125 is formed on diaphragm 117 and is engageable by ball valve 116 when the latter moves upwardly. A central passageway 126 is formed in seat 125, and a downwardly extending boss 127 is centrally formed on cover 118 and engages the upper end of valve seat 125 to limit upward movement of the valve seat. Boss 127 is centrally grooved, as indicated at 128 in FIGURE 3, and this groove is contiguous with a radially extending groove 129 in the underside of cover 118.

An extension 131 is formed on housing 102 transversely to passage 109, and an outlet or delivery port 132 is formed in this extension. A vertically extending bore 133 extends downwardly from housing portion 111 in the vicinity of extension 131, and an L-shaped passageway 134 connects bore 133 with port 132. A boss 135 is formed at the outer edge of cover 118 and extends downwardly into bore 133; this boss is provided with a groove indicated at 136 in FIGURE 3, which is contiguous with groove 129.

In order to preselect the metered quantity of fluid, a centrally apertured disc-like member 137 may be disposed between cover 118 and diaphragm 117, surrounding boss 127. In practice, various thicknesses of disc 137 may be provided for various desired meter outputs. The discs may be fabricated of a plastic material and may be color coded.

In operation, assuming an initial condition in which the pressure at inlet conduit 106 is reduced, the parts will be as shown in FIGURE 5, that is, diaphragm 117 will be contracted and in engagement with housing portion 111, and sleeve 115 will be in engagement of ball valve 116, the latter being withdrawn downwardly from seat 125.

Upon elevation of the pressure applied to line 106, fluid will flow upwardly from conduit 109 through conduit 114 and around ball valve 116 into the chamber 138 formed between diaphragm 117 and housing portion 111, as seen in FIGURE 6, the fluid passing through grooves 123 and 124. Ball valve 116 will be forced against seat 125, preventing fluid flow from chamber 138 into chamber 122, boss 127 holding seat 125 in position. This will cause diaphragm 123 to be distended upwardly, reducing the size of chamber 122 and forcing the fluid therein to pass through grooves 128, 129 and 136, passageways 133 and 134 to delivery port 132. The volume of fluid thus delivered will depend upon the size of disc 137 if such a disc is present, and upon the relative dimensions of housing 102 and cover 118.

Although sleeve 115 will initially be forced outwardly away from ball valve 116, as seen in FIGURE 6, the fluid pressures on the inside and outside of sleeve 115 will become equalized and the sleeve will contract until it engages ball valve 116 even while pressure is maintained at inlet conduit 106. When the pressure at line 106 is relieved, the pressure in chamber 138 will cause ball valve 116 to be forced away from seat 125, and passage 126 will be opened so that fluid can flow from chamber 138 to chamber 122, as shown in FIGURE 7. The fluid wil be urged to flow in this direction by the action of diaphragm 117, which tends to assume its original shape as shown in FIGURE 5. This cycle will be repeated upon each re-application of pressure to line 106.

The action of meter 101 differs in several respects from that of meter 19. In the case of meter 19, portion 39 of bladder 33 remains away from the surface of ball valve 37 as long as pressure is being applied to the meter, returning to its seat around the ball only after the pressure is relieved and a quantity of fluid has flowed backwards past the ball and allowed the sleeve to return to the diameter of the ball. In the case of meter 101, sleeve 115 is forced away from ball valve 116 by the pressure being applied to the meter, but as fluid flows around the ball and fills chamber 138, the pressure will become equalized on both the inside and outside of sleeve 115, permitting the sleeve to contract and return to its seat around the ball even though the pressure is still applied to the meter. This means that when the pressure to the meter is relieved, there will be no back flow of fluid around the ball into the supply system, and all the fluid removed from chamber 138 will be transferred to chamber 122, and will be further transferred on the next pressure pulse to delivery port 132.

Another difference between meters 19 and 101 is in the method by which the volume of meter fluid may be varied. In the case of meter 19, the volume can be varied to a certain extent by changing the size of ball valve 37. To achieve a relatively large change in volume, the entire meter would be made in a larger size. In the case of metering valve 101, a change in the volume of the metered fluid is achieved by assembling into the meter any of various thicknesses of discs 137, while the other parts of the meter may remain identical. Meters of widely varying outputs can therefore be constructed, these meters having identical shapes and sizes. Discs 137 could be color coded and, since they are visible through transparent cover 118, a user could easily differentiate between meters of various outputs. Cover 118 will also permit the user to observe the functioning of the meter.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a valve for measuring and delivering predetermined quantities of fluid comprising a housing having an inlet for fluid, an elastic bladder surrounding said inlet and receiving all fluid flowing through it, said housing providing a chamber around the outside of the said bladder, expansion and contraction of said bladder changing the volume of said chamber, said chamber having an outlet for fluid, and valve means inside said bladder acting to block the flow of fluid through the bladder when fluid enters under pressure through said inlet and thereby causing expansion of the bladder to reduce the volume of said chamber.

2. In a metering valve comprising a rigid walled housing providing a chamber having an inlet at one end and an outlet at the other end, a tubular elastic member open at both ends disposed in said chamber and having one end connected to the inlet of the chamber to receive fluid flowing through the inlet, the other end of said tubular member opening into said chamber, means providing a valve seat in said elastic member located at said other end, a valve inside said elastic member and cooperating with said valve seat to permit or block flow out of said other end, said valve element being slightly larger in diameter than the diameter of said elastic member.

3. A metering valve for measuring and delivering predetermined quantities of fluid comprising an outer casing having rigid walls and providing a chamber having an outlet, means providing an inlet to said chamber, a flexible member surrounding said inlet and receiving all fluid from it, said flexible member containing a valve seated on its outlet periphery in said member at a section located intermediate the ends of the member, said flexible member having an outlet and a valve seat against which a face of said valve engages to block flow through said member outlet, said flexible member including a chamber located downstream from said valve and sealed off by said valve when the periphery of the valve engages the member, said valve being movable to provide for flow from said downstream chamber into said member outlet, said member outlet opening into said casing chamber, said flexible member being expandable into said casing chamber to reduce volume thereof when fluid enters said inlet.

4. In a fluid metering device, a housing having an inlet port and a delivery port, an elastic flexible member within said housing and forming first and second chambers therein, said first chamber being connectable to said inlet port, said second chamber being directly connected to said delivery port, a valve seat formed on said flexible member and having a passageway leading from said first to said second chamber, a valve member disposed in said first chamber, and means responsive to elevation of pressure at said inlet port for causing said valve member to engage said seat and close said passageway, said flexible member having a normal contracted position in which said first chamber is relatively small and said second chamber is relatively large but being distendable upon elevation of pressure at said inlet port and closure of said passageway by said valve member to cause a reduction in size of said second chamber and an increase in size of said first chamber whereby fluid in said second chamber will be forced toward said delivery port, reduction of pressure at said inlet port causing said valve member to be withdrawn from said valve seat, whereby contraction of said flexible member will cause fluid flow from said first chamber through said passageway to said second chamber.

5. In a fluid metering device, a housing having an inlet port and a delivery port, said inlet port being connectable to a selectively pressurizable source of fluid, an elastic flexible member within said housing and forming first and second chambers therein, said first chamber being connectable to said inlet port, said second chamber being directly connected to said delivery port, a valve seat formed on said flexible member and having a passageway located centrally of the valve seat leading from said first to said second chamber, a valve member disposed in said first chamber, and a sleeve of flexible and elastic material extending from said inlet port into said first chamber and surrounding said valve member, the valve member being of circular shape with a diameter greater than the unstressed diameter of said sleeve but smaller than the distance between said inlet port and valve seat, said sleeve being expandable to disengage said valve member, whereby elevation of fluid pressure at said inlet port will cause said valve member to engage said valve seat, said sleeve being expandable in response to elevation of inlet port fluid pressure to disengage said valve member so as to permit the fluid to pass about said valve member, said first-mentioned flexible member having a normal contracted position in which said first chamber is relatively small and said second chamber is relatively large but being distendable by elevation of inlet port fluid pressure and engagement of said valve member with said valve seat to cause enlargement of said first chamber and diminution of said second chamber whereby fluid will be forced from said second chamber toward said delivery port, said sleeve being contractable upon equilization of pressure on opposite sides thereof to re-engage said valve member, reduction of pressure at said inlet port causing said valve member to be withdrawn from said valve seat whereby said first-mentioned flexible member may contract to cause fluid to flow from said first chamber through said passageway to said second chamber.

6. In a metering device, a housing having an inlet port and a delivery port, said inlet port being connectable to a selectively pressurizable source of fluid the housing having a relatively narrow lower portion and a relatively wide upper portion, the upper portion of the housing being enclosed by a generally flat wall, a cover having transparent portions secured to said upper housing portion and spaced thereabove, an elastic and flexible diaphragm between said housing and cover and forming first and second chambers therein, passageway means connecting said second chamber directly to said delivery port, a downwardly extending recess in said relatively narrow housing portion connected to said first chamber, passageway means connecting said recess to said inlet port, a ball valve within said recess, a flexible and elastic sleeve surrounding said ball valve and connected to said last-mentioned passageway means, said sleeve having a contracted position in engagement with said ball valve, said sleeve being expandable in response to elevation of inlet port fluid pressure to disengage said ball valve so as to permit the fluid to pass about said ball valve, and a valve seat on said diaphragm having a passageway located centrally of the valve seat and connecting said first and second chambers, the diameter of said ball valve being smaller than the distance between said inlet port and valve seat, said sleeve being expandable to disengage said ball valve, said ball valve being engageable with said valve seat in response to elevation of pressure at said inlet port, said diaphragm having a normal contracted position in which said first chamber is relatively small and said second chamber relatively large, but being distendable in response to elevation of pressure at said inlet port and engagement of said ball valve with said valve seat to increase the size of said first chamber and diminish the size of said second chamber, reduction of pressure at said inlet port causing said ball valve to be withdrawn from said valve seat and permitting said diaphragm to contract, whereby fluid will pass from said first to said second chamber through said passageway.

7. The combination according to claim 6, further provided with a spacer of predetermined size within said second chamber.

8. In a metering valve, a housing having inlet and outlet ports, a member within said housing dividing it into first and second chambers, said member being movable toward said second chamber in response to an increase in pressure in said first chamber to cause expansion of said first chamber and contraction of said second chamber, and being further movable toward said first chamber in response to a reduction in pressure therein to cause contraction of said first chamber and expansion of said second chamber, the second chamber being connected to said outlet port, and means responsive to pressure at said inlet port to connect said inlet port and first chamber and seal off said first chamber from said second chamber, and responsive to reduction in pressure at said inlet port to seal off said first chamber from said inlet port and connect said first and second chambers.

9. In a metering valve, a housing having inlet and outlet ports, a member mounted within said housing and dividing its interior into first and second chambers, said member having a normal position in which said first chamber is relatively contracted and said second chamber relatively enlarged but being movable toward said second chamber in response to an increase in pressure within said first chamber to enlarge the first chamber and contract the second chamber, said second chamber being connected to said outlet port, a passageway leading from said first chamber to said second chamber, and a valve within said housing disposed between said inlet port and said first chamber adjacent said passageway, said valve being responsive to an increase in pressure at said inlet port to connect said inlet port and first chamber and close said passageway between said first and second chambers, whereby fluid entering said inlet port will collect in said first chamber and fluid within said second chamber will be forced through said outlet port, said valve being further responsive to a subsequent decrease in pressure at said inlet port to seal off said first chamber from said inlet port and open said passageway between said first and second chambers, whereby fluid previously collected in said first chamber will flow into said second chamber by virtue of the return of said housing dividing member to its normal position.

References Cited by the Examiner

UNITED STATES PATENTS

| 1,553,768 | 9/25 | Gleason | 137—516.25 X |
| 2,627,388 | 2/53 | Johnson et al | 137—516.25 X |
| 2,938,538 | 5/60 | Allen | 137—516.25 X |
| 3,104,787 | 9/63 | Thompson | 222—490 |

FOREIGN PATENTS 1,233,679  5/60  France.

RAPHAEL M. LUPO, *Primary Examiner.*

LOUIS J. DEMBO, *Examiner.*